(12) United States Patent
Wang et al.

(10) Patent No.: US 12,722,130 B2
(45) Date of Patent: Sep. 1, 2026

(54) DIRECT-DRIVE DENTAL MATERIAL MIXING DEVICE

(71) Applicant: MONITEX INDUSTRIAL CO., LTD., New Taipei (TW)

(72) Inventors: Shu-Lung Wang, New Taipei (TW); Shen-Yao Chiang, New Taipei (TW)

(73) Assignee: MONITEX INDUSTRIAL CO., LTD., New Taipei City (TW)

( * ) Notice: Subject to any disclaimer, the term of this patent is extended or adjusted under 35 U.S.C. 154(b) by 645 days.

(21) Appl. No.: 18/315,292

(22) Filed: May 10, 2023

(65) Prior Publication Data

US 2024/0375070 A1 Nov. 14, 2024

(51) Int. Cl.

*B01F 29/00* (2022.01)
*A61C 19/00* (2006.01)
*B01F 35/32* (2022.01)
*B01F 35/42* (2022.01)

(52) U.S. Cl.

CPC .......... *B01F 29/4031* (2022.01); *A61C 19/00* (2013.01); *B01F 35/3204* (2022.01); *B01F 35/3211* (2022.01); *B01F 35/422* (2022.01)

(58) Field of Classification Search

CPC . A61C 5/68; B01F 31/24; B01F 31/26; B01F 35/422; Y10S 366/602

See application file for complete search history.

(56) References Cited

U.S. PATENT DOCUMENTS 1,688,062 A * 10/1928 Terranova ............... B01F 31/23 366/209
2,201,428 A * 5/1940 Chott ....................... A61C 5/68 366/602
2,363,937 A * 11/1944 Brandt .................... B01F 31/85 241/1
3,583,647 A * 6/1971 Paterson .................. A61C 5/68 241/137
3,749,371 A * 7/1973 Folkenroth .............. A61C 5/68 248/605

(Continued)

FOREIGN PATENT DOCUMENTS

CN 108261967 A * 7/2018 ............. B01F 31/26
CN 209663189 U * 11/2019

(Continued)

*Primary Examiner* — Claire X Wang
*Assistant Examiner* — Patrick M McCarty
(74) *Attorney, Agent, or Firm* — MUNCY, GEISSLER, OLDS & LOWE, P.C.

(57) ABSTRACT

A direct-drive dental material mixing device includes a motor, a seat and a clamp, the motor includes a stator and a rotor including an output shaft, the seat includes a bottom plate, a bracket disposed on the plate and for disposing the motor, and shock-absorbing connectors respectively connecting with the plate and the bracket, each of the shock-absorbing connectors includes a pillar disposed on the plate, and a buffer spring sleeved on the pillar and with two ends respectively contacting the plate and the bracket, the buffer spring makes the bracket suspended relative to the plate, the clamp includes a shaft joint directly connected to the output shaft, and two arms respectively assembled on the shaft joint, the shaft joint and the output shaft are disposed coaxially, and an inclination angle less than 180 degrees is provided between the two arms and the shaft joint.

10 Claims, 8 Drawing Sheets

(56) References Cited

U.S. PATENT DOCUMENTS

2005/0190641 A1* 9/2005 Countz ............... B01F 35/2209
366/128
2023/0270412 A1* 8/2023 Lazewatsky ........... A61B 8/481
424/9.52

FOREIGN PATENT DOCUMENTS

| | | | | |
|---|---|---|---|---|
| CN | 214346046 | | 10/2021 | |
| DE | 202006019709 | U1 * | 3/2007 | ............... A61C 5/68 |
| DE | 102017109714 | A1 * | 11/2017 | ............... A61C 5/66 |
| TW | M313503 | | 6/2007 | |
| TW | 200911357 | | 3/2009 | |
| WO | WO-2022157332 | A1 * | 7/2022 | .............. B01F 31/24 |

* cited by examiner

20

226
272
271
273
27
228
21
227
222
251
243
26
28
235
224
225
223
231
230
236
233
234
232
22
221

20
271
272
27
225
223
224
235
21
231
226
236
227
233
232
222
211
234
241
251
261
26
262
243
221
22
24
28
245

232
234
233
226
236
21
227
222
211
241
244
251
250
242
249
248
253
212
26
262
261
28
24
243
221
22

223
225
224
229
21
235
221
226
236
22
222
211
241
234
233
232

20
232
234
233
236
243
252
251
247
246
28
261
26
262
222
24
243

DIRECT-DRIVE DENTAL MATERIAL MIXING DEVICE

FIELD OF THE INVENTION

The invention relates to a dental material mixing device, and more particularly to a direct-drive dental material mixing device capable of directly driving a clamp with a motor.

BACKGROUND OF THE INVENTION

Conventional dental material mixing devices have been disclosed in Taiwan Patent No. TW M313503, China Patent No. CN 214346046U and Taiwan Patent No. TW 200911357.

All the clamps of the devices disclosed in the aforementioned patents adopt indirect transmission, which easily causes output loss during a motor transmission process. If a certain level of motor efficiency is to be obtained, the motor output power needs to be increased, but it will increase the load on the motor. In addition, the mixing device implemented in an indirect driving manner has disadvantages such as complex structure and requiring large assembly space.

SUMMARY OF THE INVENTION

A main object of the invention is to solve the problems arising from indirect driving of a clamp in the conventional dental material mixing devices.

In order to achieve the above object, the invention provides a direct-drive dental material mixing device including a motor, a seat, and a clamp. The motor includes a stator and a rotor. The rotor includes an output shaft. The seat includes a bottom plate, a bracket disposed on the bottom plate and provided for disposing of the motor, and a plurality of shock-absorbing connectors respectively connecting with the bottom plate and the bracket. Each of the plurality of shock-absorbing connectors includes a pillar disposed on the bottom plate and a buffer spring sleeved on the pillar and with two ends respectively contacting the bottom plate and the bracket, and the buffer spring is provided for the bracket to be suspended relative to the bottom plate. The clamp is directly driven by the motor. The clamp includes a shaft joint directly connected to the output shaft, and two arms respectively assembling on the shaft joint. The shaft joint is disposed coaxially with the output shaft, and an inclination angle between the two arms and the shaft joint is less than 180 degrees.

In one embodiment, the clamp includes a rotating connector disposed on the shaft joint and fixing the inclination angle between the two arms and the shaft joint, the rotating connector includes an assembly head disposed on the shaft joint, a bushing disposed on the assembly head, and a bearing disposed on the bushing, and the assembly head and the two arms are disposed coaxially.

In one embodiment, each of the two arms includes a free end and a fixed end fixed to the rotating connector through at least one fixing member, a gap between two free ends of the two arms is greater than a gap between two fixed ends of the two arms.

In one embodiment, the direct-drive dental material mixing device includes a clamp buffer connecting the bottom plate and the clamp, the clamp buffer includes a first fixing seat disposed on the bottom plate, and a first telescopic spring hooked between the first fixing seat and the two arms.

In one embodiment, each of the plurality of shock-absorbing connectors includes at least one first washer, and at least one end of the buffer spring is provided with the at least one first washer.

In one embodiment, the seat includes a plurality of adjustment connectors respectively disposed on the pillar, each of the plurality of adjustment connectors includes an adjustment spring connecting to the bracket and sleeved on the pillar, and a manipulating nut disposed on the pillar and located at an end of the adjustment spring opposite to contacting the bracket.

In one embodiment, each of the plurality of adjustment connectors includes at least one second washer, and at least one end of the adjustment spring is provided with the at least one second washer.

In one embodiment, the bracket includes a base plate and a support plate, a projection of the base plate is located on the bottom plate, the base plate is located between the buffer spring and the adjustment spring, the support plate is connected to the base plate and assembled with the motor, and the base plate includes a plurality of through holes respectively provided for inserting the pillars.

In one embodiment, the direct-drive dental material mixing device includes a bracket buffer connecting the bottom plate and the bracket, the bracket buffer includes a second fixing seat disposed on the bottom plate, and a second telescopic spring hooked between the second fixing seat and the base plate.

In one embodiment, the base plate is formed with a plurality of screw holes, and the seat includes a plurality of fixing screws respectively disposed in the plurality of screw holes and assembled with the base plate and the bottom plate.

In one embodiment, the direct-drive dental material mixing device includes a control circuit board electrically connected to the motor.

Through the aforementioned implementation of the invention, the invention has the following characteristics compared with the conventional technique: in the invention, the shaft joint is disposed coaxially with the output shaft, and the shaft joint is directly assembled on the output shaft, so that the clamp is directly driven by the motor, thereby the direct-drive dental material mixing device reduces a workload of the motor and improves the problems of complex structure, bulky volume and kinetic energy loss caused by the conventional indirect-drive structure.

DETAILED DESCRIPTION OF THE PREFERRED EMBODIMENTS

Figure 1:
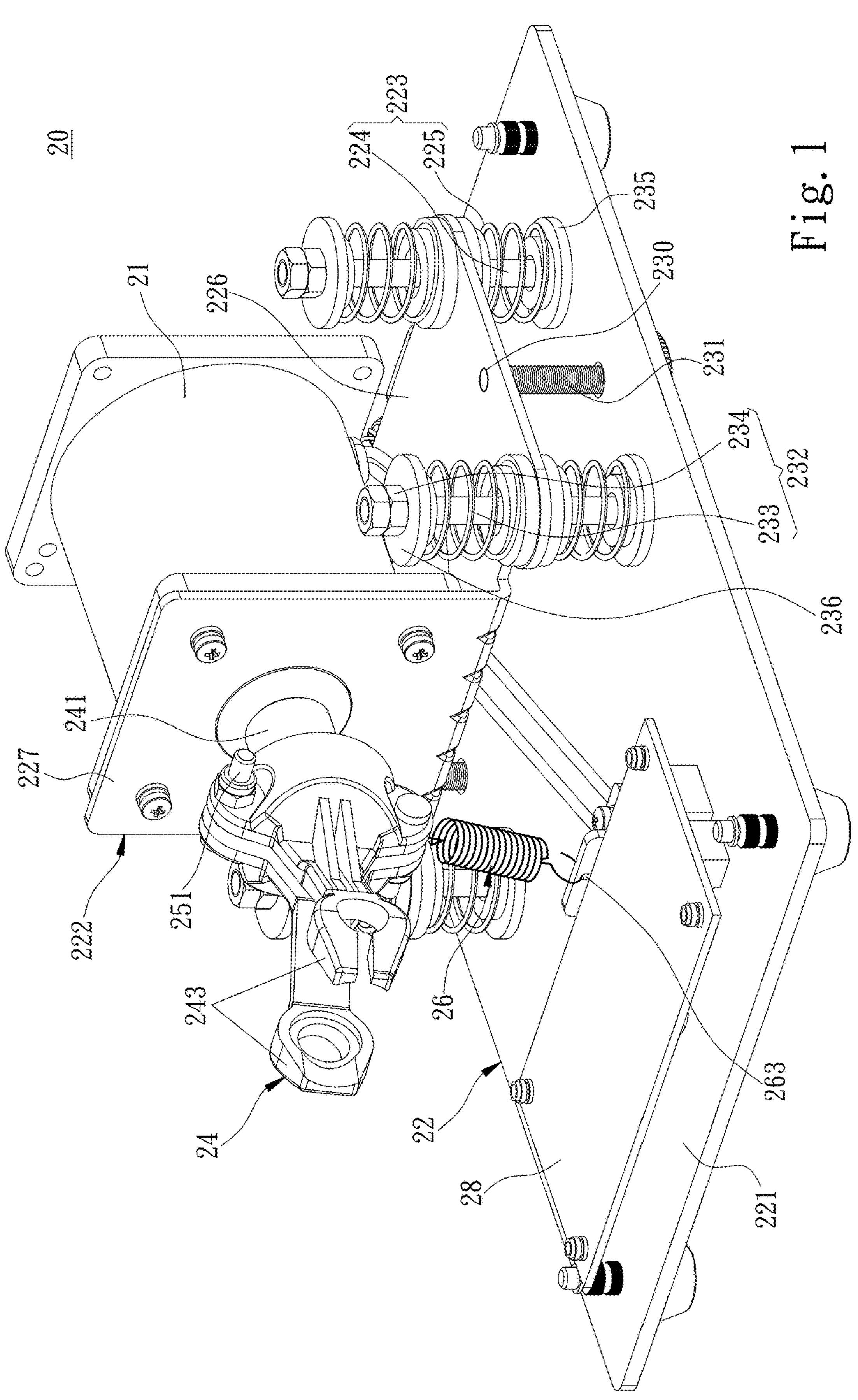
FIG. 1 is a first perspective view of one embodiment of the invention.

The detailed description and technical content of the invention are described below with reference to the drawings.

Please refer to FIG. 1, FIG. 2, FIG. 3, and FIG. 4, the invention provides a direct-drive dental material mixing device 20 including a motor 21, a seat 22 and a clamp 24. The motor 21 serves as a power source of the direct-drive dental material mixing device 20. The motor 21 includes a stator and a rotor. The stator and the rotor are structures that are conventional in the technical field of the motor 21, and detailed structures thereof are not a focus of the specification, so the stator and the rotor will not be described in detail hereinafter, nor will the stator and the rotor be shown in the figures. The rotor is driven by the stator and rotates relative to the stator when the motor 21 is started. The rotor includes an output shaft 211, and the output shaft 211 rotates with the rotor to output kinetic energy. The output shaft 211 includes an axial extension line 212.

The seat 22 includes a bottom plate 221, a bracket 222 disposed on the bottom plate 221, and a plurality of shock-absorbing connectors 223 connecting with the bottom plate 221 and the bracket 222. The bracket 222 is located above the bottom plate 221. The bracket 222 is provided for assembling the motor 21. The bracket 222 is forced when the motor 21 vibrates, and the plurality of shock-absorbing connectors 223 provide a buffer function for the bracket 222. Each of the plurality of shock-absorbing connectors 223 includes a pillar 224 disposed on the bottom plate 221, and a buffer spring 225 sleeved on the pillar 224. Two ends of the buffer spring 225 respectively contact the bottom plate 221 and the bracket 222, thereby the bracket 222 is suspended relative to the bottom plate 221, and the buffer spring 225 has contraction and rebound properties to absorb vibration of the bracket 222 and prevent the bracket 222 from colliding with the bottom plate 221.

Figure 3:
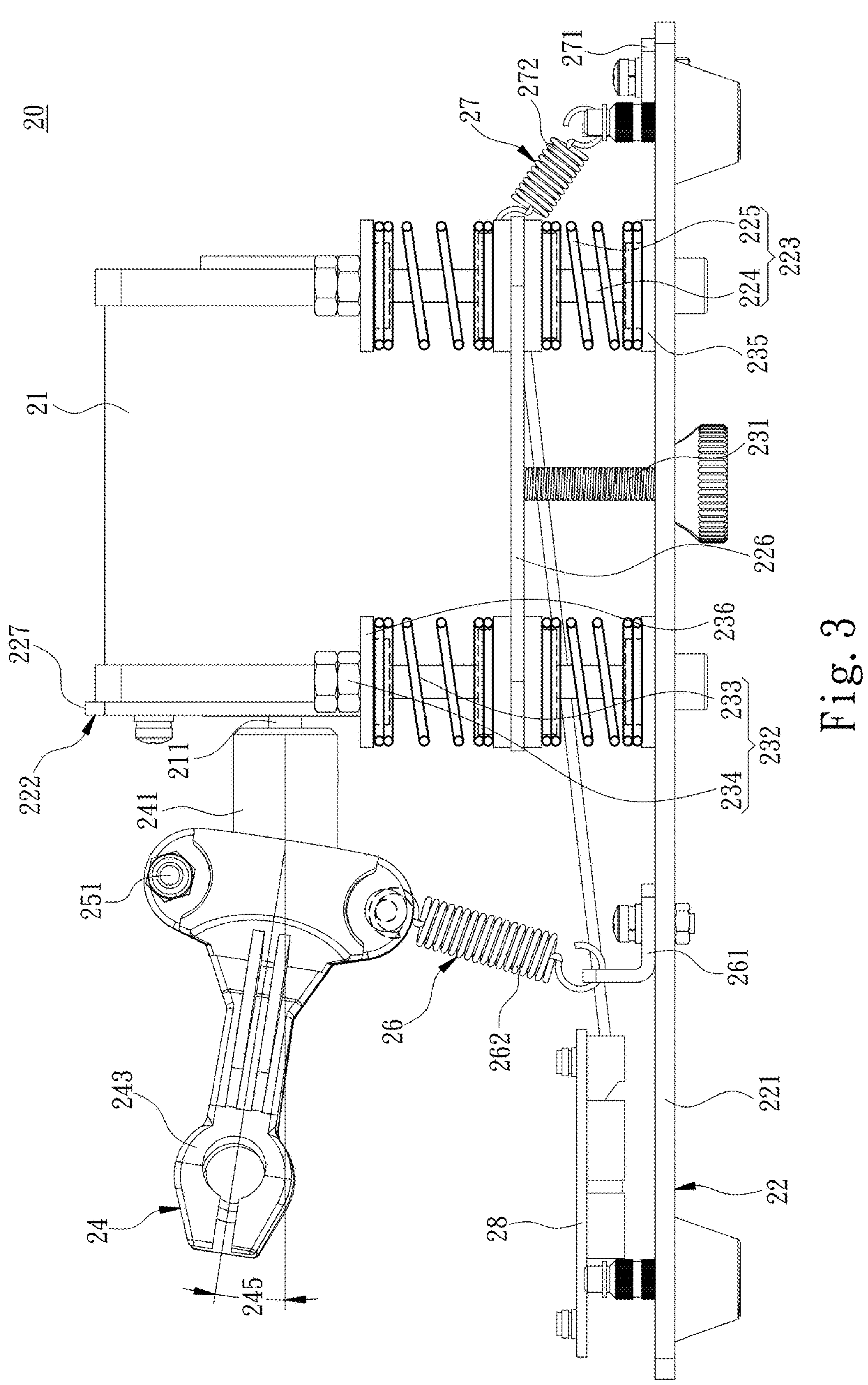
FIG. 3 is a side view of one embodiment of the invention.
Figure 4:
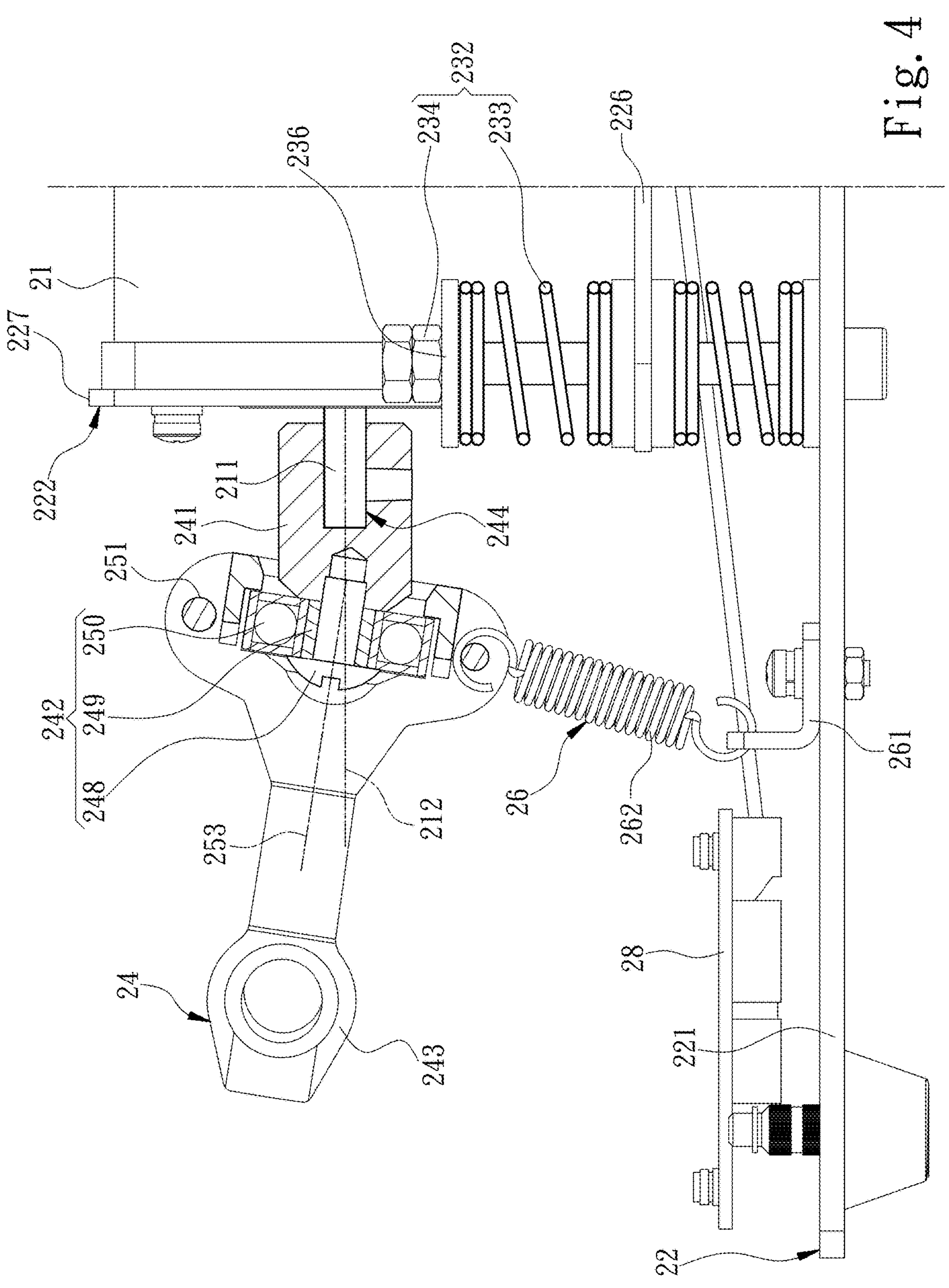
FIG. 4 is a cross-sectional view of partial components of one embodiment of the invention.
Figure 5:
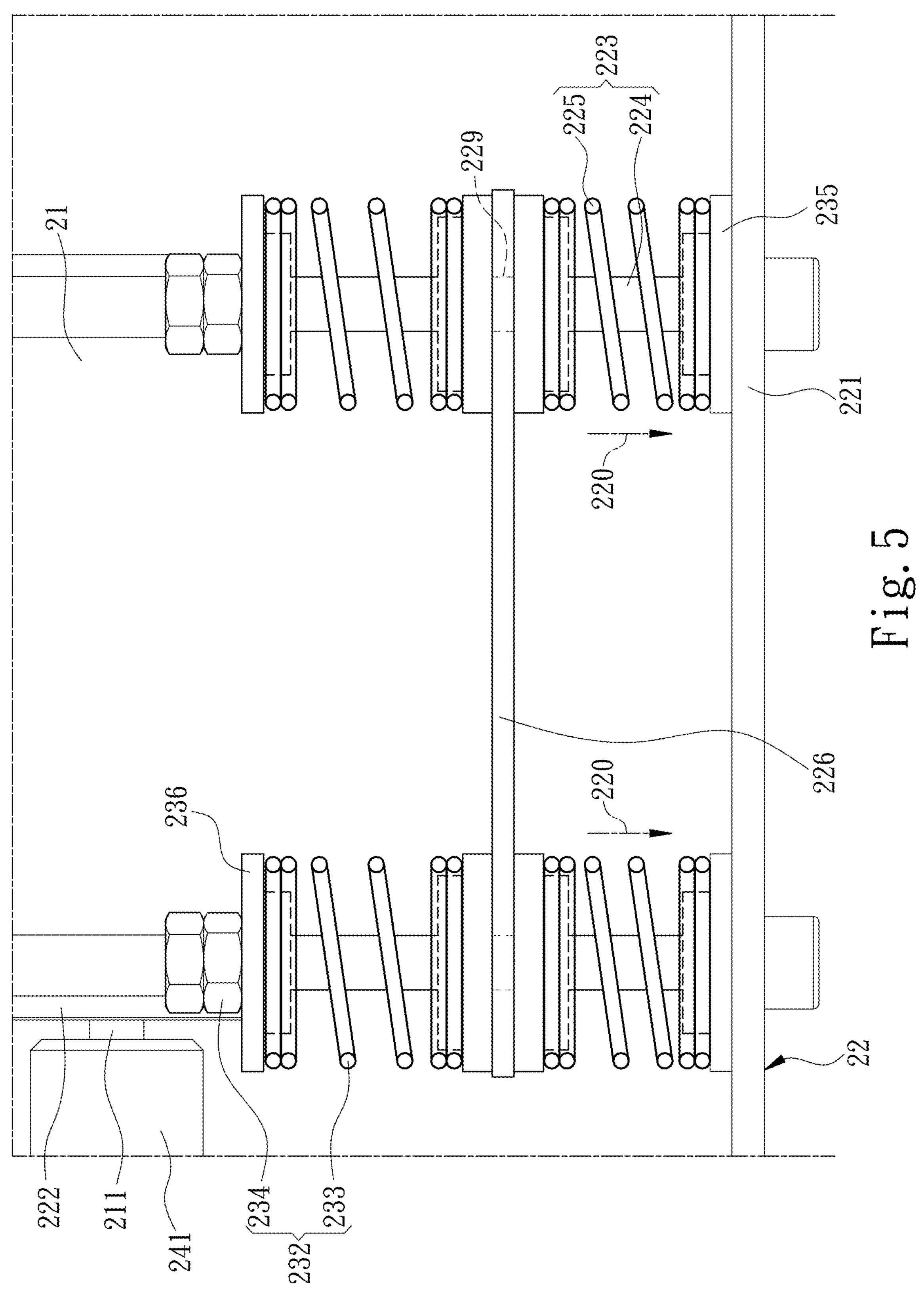
FIG. 5 is a first side view of partial components of one embodiment of the invention.
Figure 6:
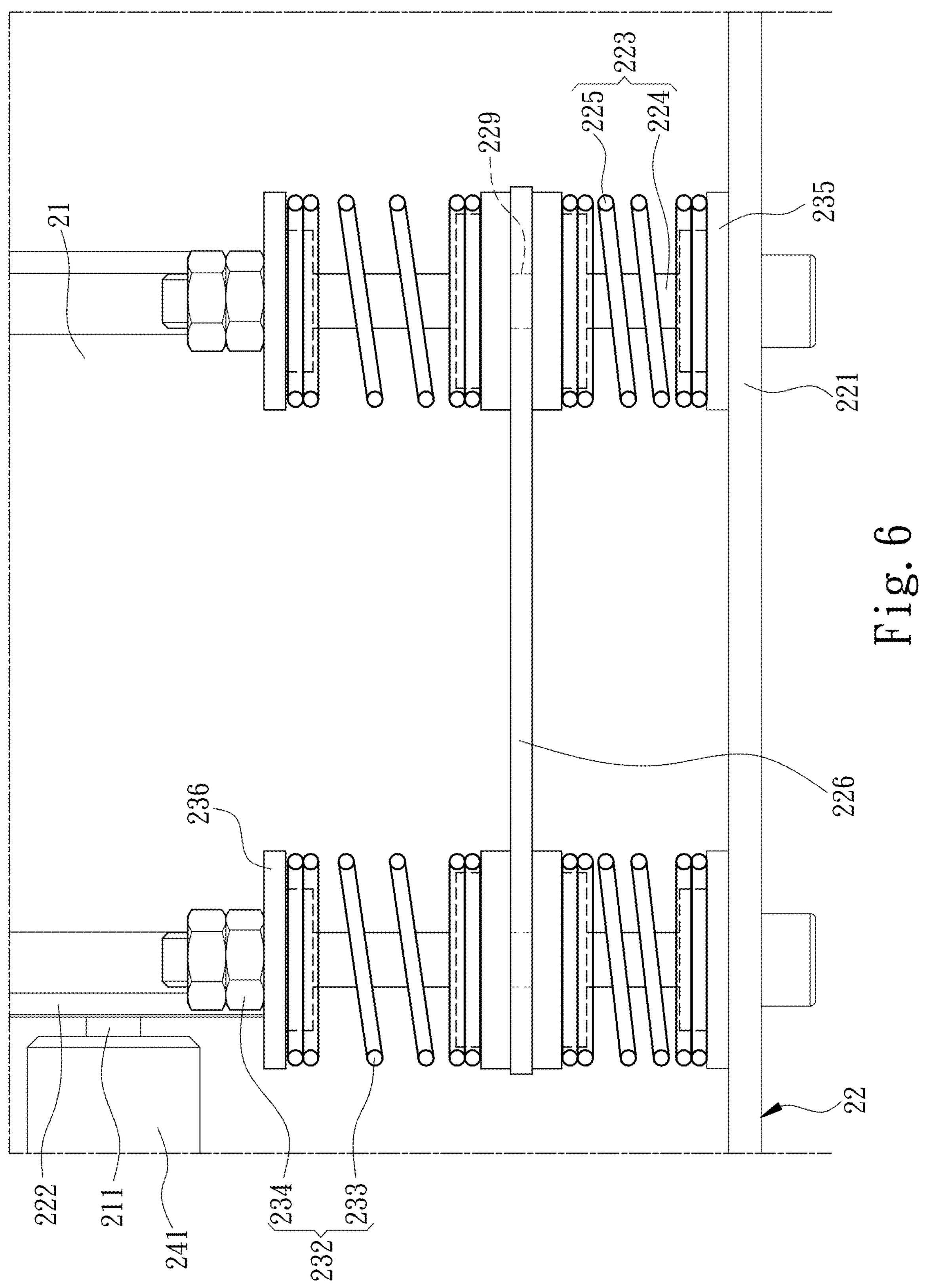
FIG. 6 is a second side view of partial components of one embodiment of the invention.
Figure 7:
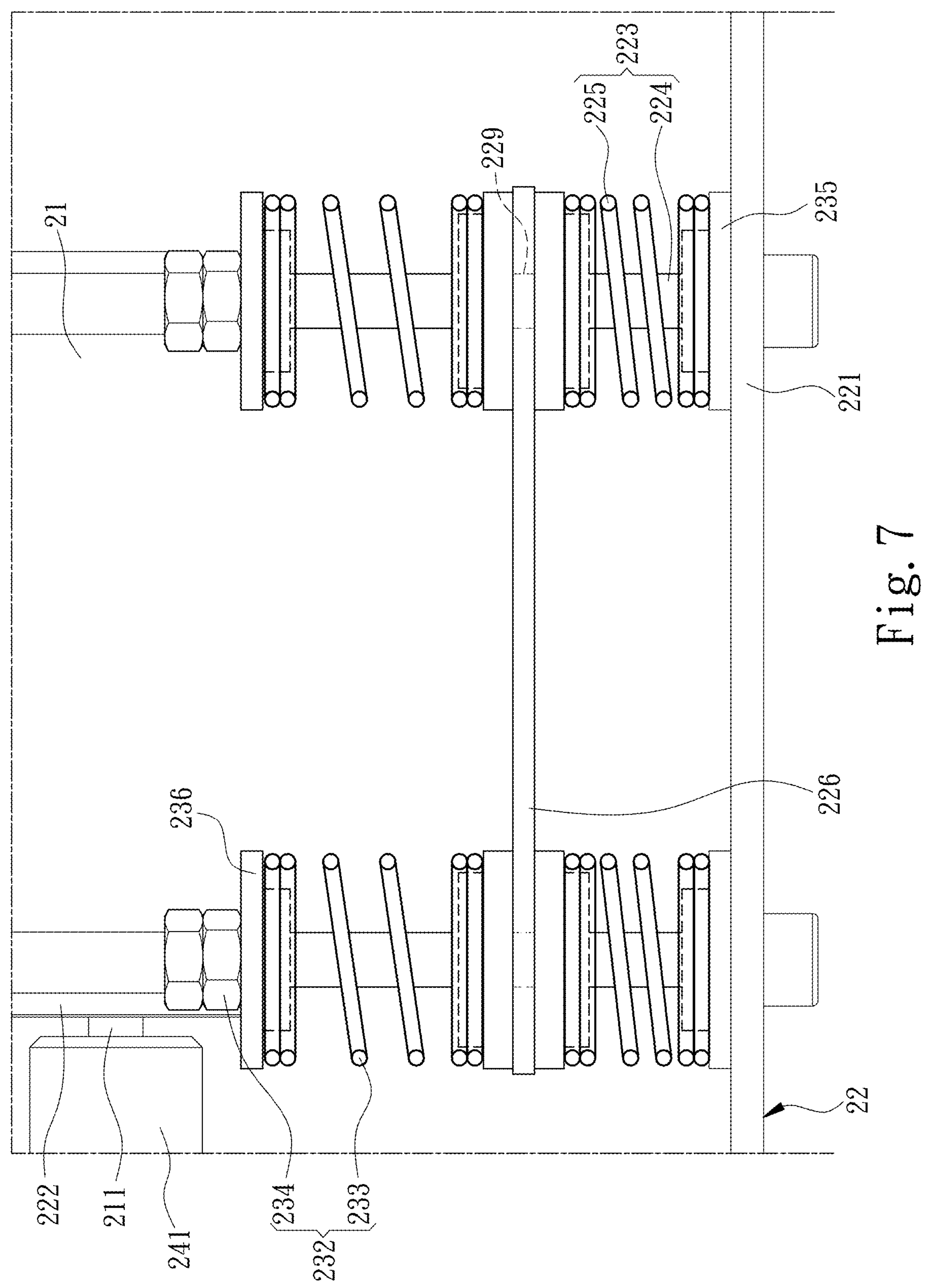
FIG. 7 is a third side view of partial components of one embodiment of the invention.
Figure 8:
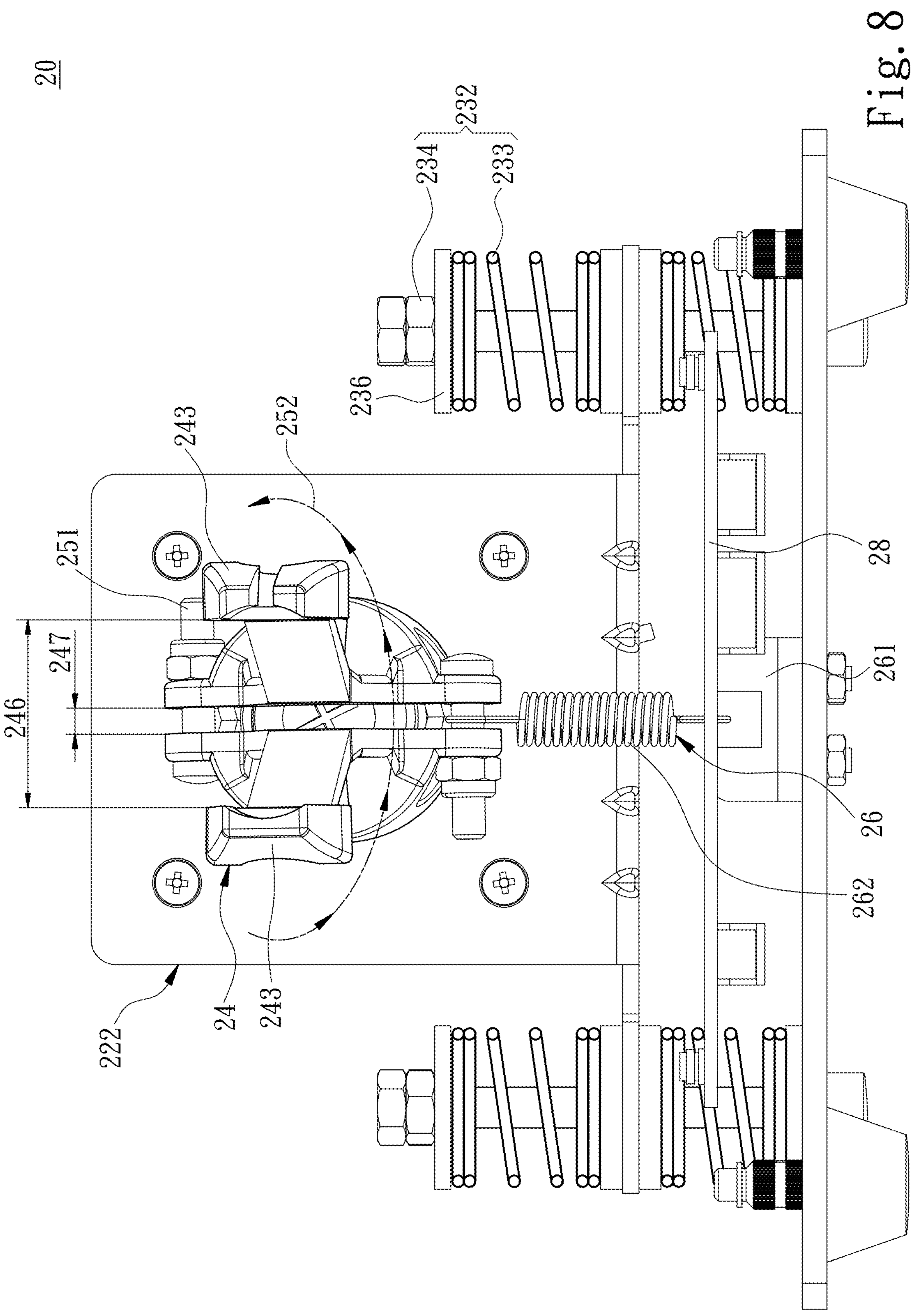
FIG. 8 is a front view of one embodiment of the invention.

As shown in FIG. 4, FIG. 5, FIG. 6, FIG. 7, and FIG. 8, the clamp 24 is directly driven by the motor 21. The clamp 24 is integrally formed, or installed on the motor 21 in the form of a component. In detail, the clamp 24 includes a shaft joint 241 and two arms 243. The shaft joint 241 includes a shaft hole 244. The shaft hole 244 is provided for the shaft joint 241 to be directly connected to the output shaft 211, thus the shaft joint 241 is located on the axial extension line 212 and disposed coaxially with the output shaft 211. Moreover, the two arms 243 are directly or indirectly assembled with the shaft joint 241. An inclination angle 245 between the two arms 243 and the shaft joint 241 is less than "180" degrees (as shown in FIG. 3). In one embodiment, the clamp 24 further includes a rotating connector 242 disposed on the shaft joint 241. The rotating connector 242 includes an assembly head 248, a bushing 249 and a bearing 250. The assembly head 248 is disposed on the shaft joint 241 and disposed coaxially with the two arms 243. An included angle between an axial extension line 253 of the assembly head 248 and the axial extension line 212 of the shaft joint 241 is less than "180" degrees, so that after the two arms 243 are assembled, the two arms 243 include the inclination angle 245 relative to the shaft joint 241. The bushing 249 is disposed on the assembly head 248 and assembled with the bearing 250. When the motor 21 is started, the two arms 243 move along an elliptical motion trajectory 252 relative to the shaft joint 241 under an action of the rotating connector 242.

In another embodiment, each of the two arms 243 includes a free end and a fixed end fixed to the rotating connector 242 through at least one fixing member 251. A gap (as indicated by reference number 246) between two free ends of the two arms 243 is greater than a gap (as indicated by reference number 247) between two fixed ends of the two arms 243, thereby the free ends of the two arms 243 provide a clamping function.

Hereinafter, operation of the direct-drive dental material mixing device 20 will be described. Assuming that the motor 21 is not activated initially, and the buffer spring 225 is not compressed at this time. When the motor 21 is activated, the motor 21 generates vibration to force the bracket 222 to vibrate, and then the bracket 222 compresses the buffer spring 225 along a trajectory (as indicated by reference number 220). At this time, the buffer spring 225 absorbs vibration caused by the bracket 222 and prevents the bracket 222 from colliding with the bottom plate 221, so as to provide a buffering effect on the bracket 222, thereby reducing noise and vibration generated by the motor 21 and the bracket 222.

From the foregoing, it can be known that the clamp 24 of the invention is disposed in a direct-drive mode, which reduces the problems of kinetic energy loss, complex structure, bulky volume and heavy weight caused by the conventional indirect-drive mode. At the same time, the motor 21 directly drives the clamp 24 in the invention, and it is not required to increase an output power of the motor 21 to achieve the same working efficiency, which has an advantage of reducing a load on the motor 21.

Figure 2:
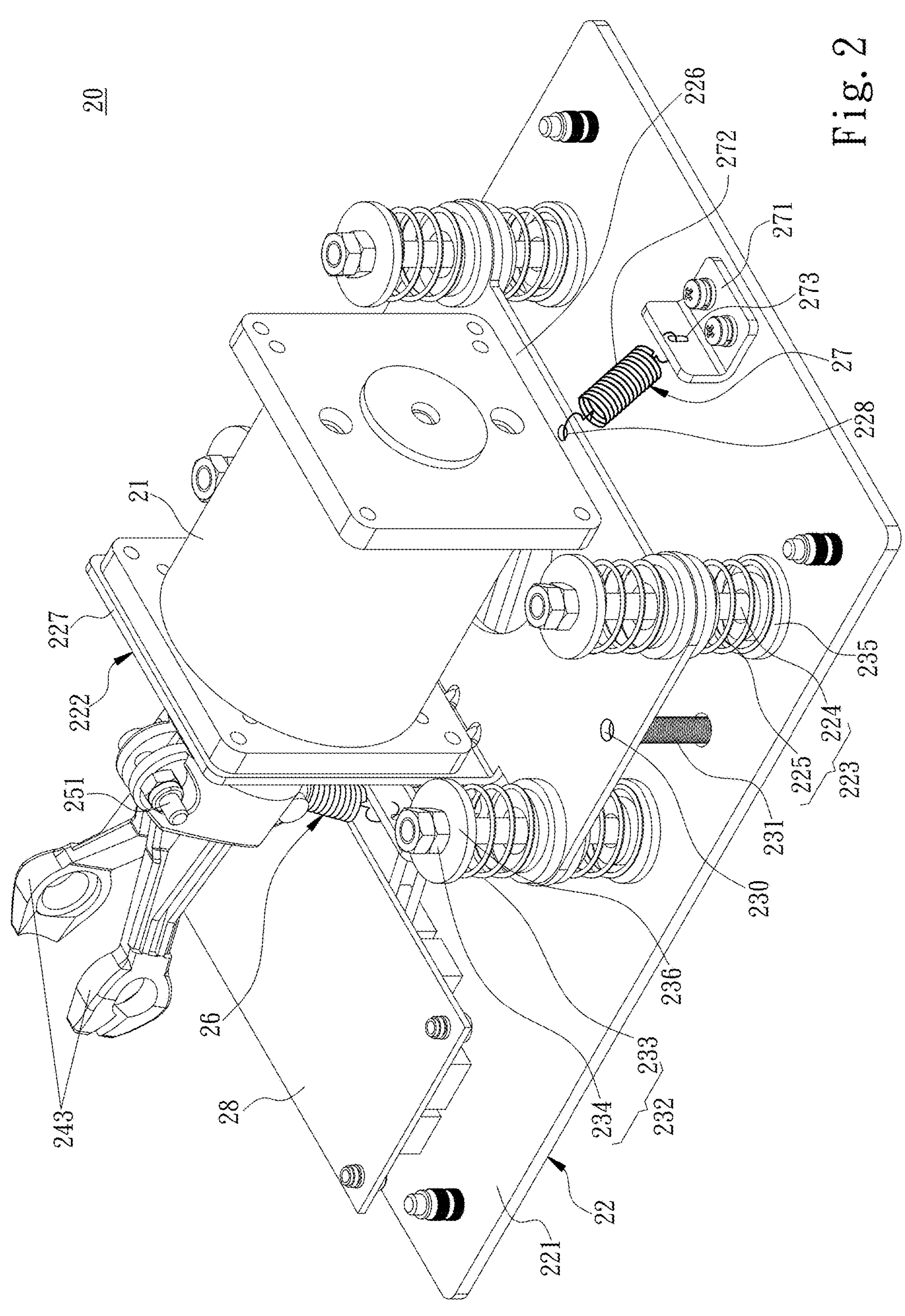
FIG. 2 is a second perspective structural view of one embodiment of the invention.

In order to assist in stabilizing a movement of the clamp 24 in the invention, the direct-drive dental material mixing device 20 includes a clamp buffer 26, and the clamp buffer 26 connects the bottom plate 221 and the clamp 24. The clamp buffer 26 includes a first fixing seat 261 fixed on the bottom plate 221, and a first telescopic spring 262 hooked between the first fixing seat 261 and the two arms 243. More specifically, the first fixing seat 261 includes a first hole 263. One end of the first telescopic spring 262 is assembled on the first hole 263, and another end of the first telescopic spring 262 is assembled on the two arms 243. The first telescopic spring 262 expands and contracts with the movement of the clamp 24, thereby providing the clamp 24 with a buffering effect. In another embodiment, in order to assist in stabilizing movement of the bracket 222 in the invention, the direct-drive dental material mixing device 20 includes a bracket buffer 27 (as shown in FIG. 2 and FIG. 3). The bracket buffer 27 connects the bottom plate 221 and the bracket 222. The bracket buffer 27 includes a second fixing seat 271 disposed on the bottom plate 221, and a second telescopic spring 272 hooked on the second fixing seat 271. The second fixing seat 271 includes a second hole 273. The bracket 222 includes a base plate 226 and a support plate 227. A projection of the base plate 226 is located on the bottom plate 221. The support plate 227 connects the base plate 226 and assembles with the motor 21. The base plate 226 includes a third hole 228, two ends of the second telescopic spring 272 are respectively connected to the second hole 273 and the third hole 228. The second telescopic spring 272 expands and contracts with the vibration of the base plate 226, thereby providing the bracket 222 with a buffering effect.

The base plate 226 is located on the buffer spring 225 and includes a plurality of through holes 229 into which the pillars 224 are inserted. Also, in order to reduce shaking in a transportation process, in one embodiment of the invention, the base plate 226 is formed with a plurality of screw holes 230 (as shown in FIG. 1 and FIG. 2), and the seat 22 includes a plurality of fixing screws 231 disposed in the plurality of screw holes 230 respectively. The plurality of fixing screws 231 assemble with the base plate 226 and the bottom plate 221, and the plurality of fixing screws 231 are removed when the direct-drive dental material mixing device 20 is operating.

Please refer to FIG. 4, FIG. 5, FIG. 6, FIG. 7, and FIG. 8, in order to adjust a damping of the buffer spring 225 in the invention, in one embodiment, the seat 22 includes a plurality of adjustment connectors 232. The plurality of adjustment connectors 232 are respectively disposed on the pillars 224. Each of the plurality of adjustment connectors 232 includes an adjustment spring 233 sleeved on the pillar 224, and a manipulating nut 234 disposed on the pillar 224. More specifically, the adjustment spring 233 connects to the base plate 226, the base plate 226 is positioned between the buffer spring 225 and the adjustment spring 233, and the manipulating nut 234 is disposed at an end of the adjustment spring 233 opposite to the base plate 226. After the manipulating nut 234 is manipulated, the manipulating nut 234 displaces upward or downward relative to the pillar 224, and the manipulating nut 234 changes a compression degree of the adjustment spring 233 and the buffer spring 225 based on a position assembling with the pillar 224. For example, when the manipulating nut 234 displaces downward, the adjustment spring 233 and the buffer spring 225 are compressed, so that a degree of rebound of the adjustment spring 233 and the buffer spring 225 after being compressed is reduced, thereby providing greater damping to vibration caused by the base plate 226; on the contrary, a smaller damping is formed, so the invention is capable of changing a buffering degree that the buffer spring 225 provides is changed by adjusting a damping of the buffer spring 225.

In addition, in order to increase a buffering effect in the invention, in one embodiment, each of the plurality of shock-absorbing connectors 223 includes at least one first washer 235. At least one end of the buffer spring 225 is provided with the at least one first washer 235 so as to assist in providing a shock-absorbing effect. In another embodiment, each of the plurality of adjustment connectors 232 includes at least one second washer 236, and at least one end of the adjustment spring 233 is provided with the at least one second washer 236 so as to assist in providing a shock absorption effect.

Please refer to FIG. 1, FIG. 2, FIG. 3, and FIG. 4, in order to control the motor 21 in the invention, in one embodiment, the direct-drive dental material mixing device 20 includes a control circuit board 28 electrically connected to the motor 21. The control circuit board 28 is disposed on the seat 22 or disposed on another housing part of the direct-drive dental material mixing device 20. The control circuit board 28 controls starting and stopping, or rotational speed of the motor 21 based on received signals.

What is claimed is:

1. A direct-drive dental material mixing device, comprising:

a motor, comprising a stator and a rotor, the rotor comprising an output shaft;

a seat, comprising a bottom plate, a bracket disposed on the bottom plate and provided for disposing of the motor, and a plurality of shock-absorbing connectors respectively connecting with the bottom plate and the bracket, wherein each of the plurality of shock-absorbing connectors comprises a pillar disposed on the bottom plate and a buffer spring sleeved on the pillar and with two ends respectively contacting the bottom plate and the bracket, and the buffer spring is provided for the bracket to be suspended relative to the bottom plate; and a clamp, directly driven by the motor, the clamp comprising a shaft joint directly connected to the output shaft, two arms respectively assembling on the shaft joint, and a rotating connector disposed on the shaft joint and fixing an inclination angle between the two arms and the shaft joint, wherein the shaft joint is disposed coaxially with the output shaft, and the inclination angle between the two arms and the shaft joint is less than 180 degrees, and wherein the rotating connector comprises an assembly head disposed on the shaft joint, a bushing disposed on the assembly head, and a bearing disposed on the bushing, and the assembly head and the two arms are disposed coaxially.

2. The direct-drive dental material mixing device as claimed in claim 1, wherein each of the two arms comprises a free end and a fixed end fixed to the rotating connector through at least one fixing member, a gap between the two free ends of the two arms is greater than a gap between the two fixed ends of the two arms.

3. The direct-drive dental material mixing device as claimed in claim 1, wherein the direct-drive dental material mixing device comprises a control circuit board electrically connected to the motor.

4. The direct-drive dental material mixing device as claimed in claim 1, wherein the direct-drive dental material mixing device comprises a clamp buffer connecting the bottom plate and the clamp, the clamp buffer comprises a first fixing seat disposed on the bottom plate, and a first telescopic spring hooked between the first fixing seat and the two arms.

5. The direct-drive dental material mixing device as claimed in claim 4, wherein each of the plurality of shock-absorbing connectors comprises at least one first washer, and at least one end of the buffer spring is provided with the at least one first washer.

6. The direct-drive dental material mixing device as claimed in claim 1, wherein the seat comprises a plurality of adjustment connectors respectively disposed on each pillar, each of the plurality of adjustment connectors comprises an adjustment spring connecting to the bracket and sleeved on the respective pillar, and a manipulating nut disposed on the respective pillar and located at an end of the adjustment spring opposite to contacting the bracket.

7. The direct-drive dental material mixing device as claimed in claim 6, wherein each of the plurality of adjustment connectors comprises at least one washer, and at least one end of the adjustment spring is provided with the at least one washer.

8. The direct-drive dental material mixing device as claimed in claim 6, wherein the bracket comprises a base plate and a support plate, a projection of the base plate is located on the bottom plate, the base plate is located between the buffer spring and the adjustment spring, the support plate is connected to the base plate and assembled with the motor, and the base plate comprises a plurality of through holes respectively provided for inserting the pillars.

9. The direct-drive dental material mixing device as claimed in claim 8, wherein the direct-drive dental material mixing device comprises a bracket buffer connecting the bottom plate and the bracket, the bracket buffer comprises a fixing seat disposed on the bottom plate, and a telescopic spring hooked between the fixing seat and the base plate.

10. The direct-drive dental material mixing device as claimed in claim 8, wherein the base plate is formed with a plurality of screw holes, and the seat comprises a plurality of fixing screws respectively disposed in the plurality of screw holes and assembled with the base plate and the bottom plate.

* * * * *